RECORD LOWERING SPINDLE FOR RECORD CHANGERS

Filed Aug. 1, 1963 3 Sheets-Sheet 1

INVENTOR.
James L. D. Morrison,
BY
Brown, Jackson, Boettcher & Dienner
Attys.

RECORD LOWERING SPINDLE FOR RECORD CHANGERS

Filed Aug. 1, 1963

INVENTOR.
James L. D. Morrison,
BY
Brown, Jackson, Boettcher & Dienner
Atty's.

March 22, 1966 J. L. D. MORRISON 3,241,839

RECORD LOWERING SPINDLE FOR RECORD CHANGERS

Filed Aug. 1, 1963 3 Sheets-Sheet 3

INVENTOR.
James L. D. Morrison,
BY Brown, Jackson, Boettcher & Dienner
Attys.

United States Patent Office 3,241,839
Patented Mar. 22, 1966

3,241,839

RECORD LOWERING SPINDLE FOR RECORD CHANGERS

James L. D. Morrison, 2045 Mandeville Canyon Road, Los Angeles, Calif.

Filed Aug. 1, 1963, Ser. No. 299,336
11 Claims. (Cl. 274—10)

The present invention relates to a record changer spindle of the self-supporting type having a plurality of supporting fingers which project radially outwardly of a spindle body to support a stack of records positioned on the spindle without need for additional stabilizing means such as the usual record support arm which rests on top of the stack to prevent tilting thereof.

More specifically, this invention relates to a self-supporting record changer spindle which is adapted to lower the bottom record of a stack to the turntable in a controlled manner rather than drop a record to the turntable as in the conventional record changer.

It is known in the art to provide a record changer spindle having a plurality of circumferentially spaced primary supporting fingers which extend radially outwardly through corresponding vertical slots formed in a tubular spindle body to support a stack of records thereon. In such known devices there is also provided secondary record supporting means for supporting all but the lowermost record in a stack to permit the lowermost record to be dropped to the turn table by radially retracting the primary supporting fingers into the body of the spindle. Various means have been adopted for retracting the primary supporting fingers, and in most known structures the fingers are moved downwardly whereby they engage the lower ends of the vertical slots in the spindle body and are cammed radially inwardly until they are disposed entirely within the spindle.

It is an object of the present invention to provide an improvement in the foregoing type of record changer spindle whereby the bottom record in a stack is lowered to the turntable in a controlled manner rather than released and dropped to the turntable.

In furtherance of the foregoing object, I provide vertical slots in a tubular spindle body which slots extend downwardly approximately to the level of the turntable or slightly therebeyond whereby the primary supporting fingers will not be cammed radially inwardly into the spindle body until the record supported thereon has been positioned on the turntable. In this manner, the record is not release by the supporting fingers until it has been positioned on the turntable thereby avoiding the numerous disadvantages caused by dropping of one record upon another. In combination with the foregoing, I provide means for rotating the primary supporting fingers about the axis of the spindle so that the fingers may be moved between a first rotary position where they are in alignment with the slots formed in the spindle body and a second rotary position where the fingers are out of alignment with such slots.

According to the present invention, the rotation of the supporting fingers is accomplished in predetermined timed sequence relative to vertical movement of such fingers whereby after the fingers have been fully lowered to position a record on the turntable they are rotated out of alignment with the slots in the spindle body. The supporting fingers are then raised toward their upper position while held radially retracted through engagement with the inner wall of the spindle body, after which the supporting fingers are rotated to their original rotary position into alignment with the slots to permit the fingers to again project radially outwardly of the spindle body in an operative record supporting position. The record supporting fingers may be returned to a position of alignment with the slots in the spindle body before reaching the end of their upward travel, but preferably only after they have been raised beyod the stack of records on the turntable.

The foregoing and other advantages and uses of my invention will be apparent, or become so, as I describe the invention in greater detail in conjunction with the accompanying drawings in which.

Figure 1:
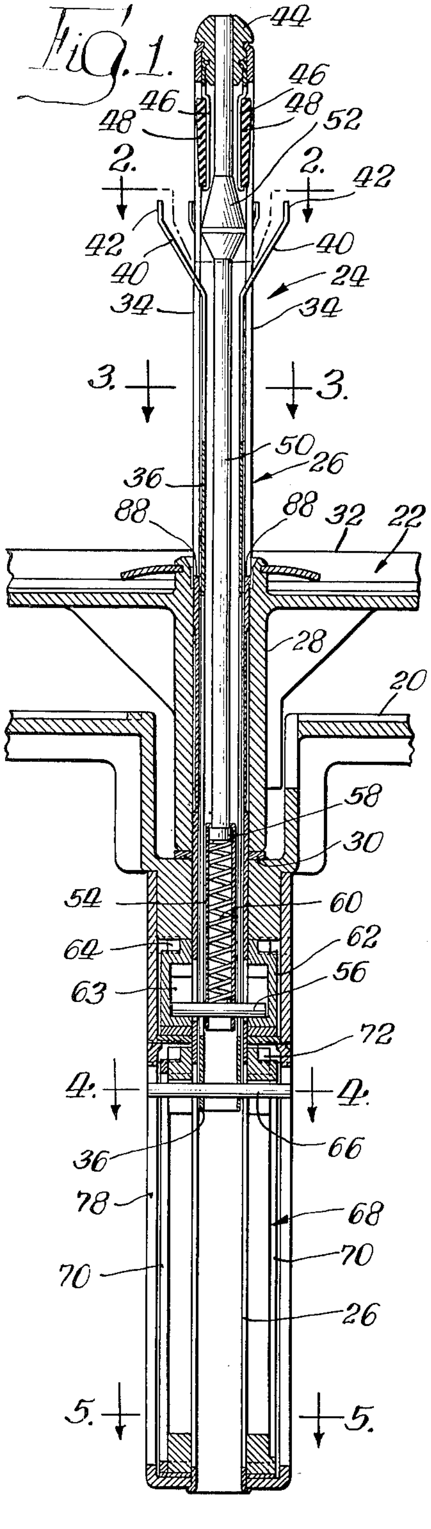
FIGURE 1 is a vertical sectional view of a record changer spindle and actuating mechanism therefor constructed in accordance with the present invention.
Figure 2:
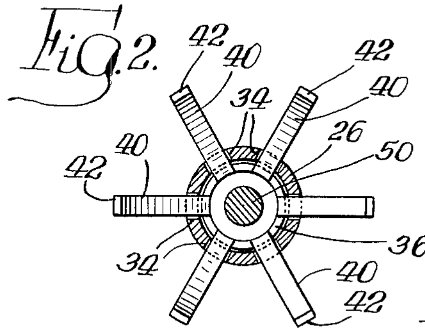
FIGURE 2 is an enlarged transverse sectional view taken substantially along the line 2—2 of FIGURE 1 showing the manner in which the primary record supporting fingers project radially outwardly of the spindle body.
Figures 3A, 3B:
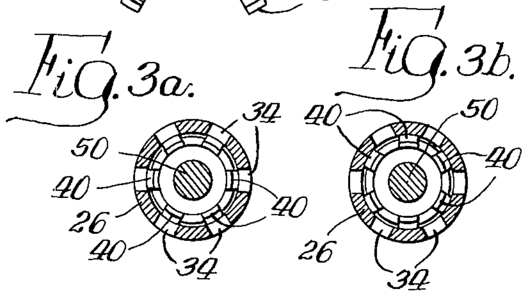
Figure 4:
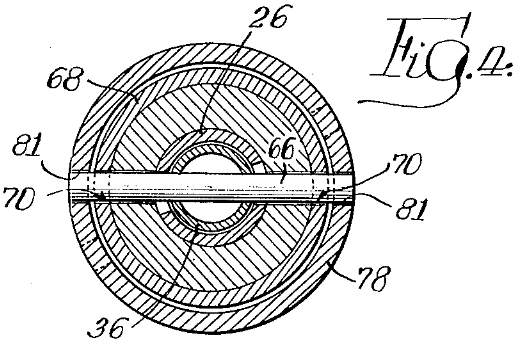
Figure 5:
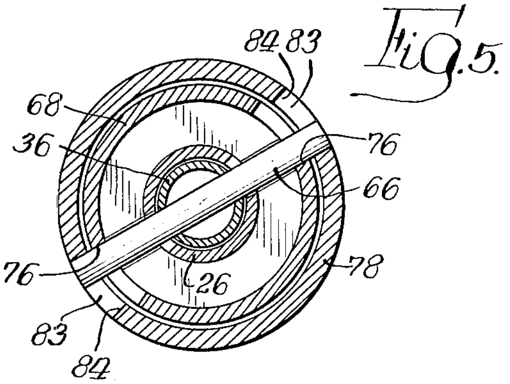
Figure 6:
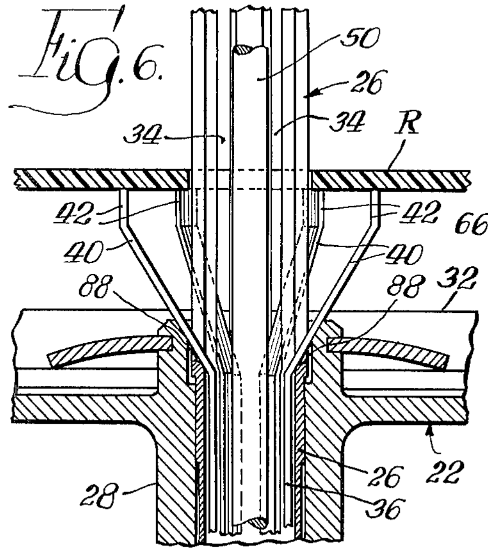
Figure 9:
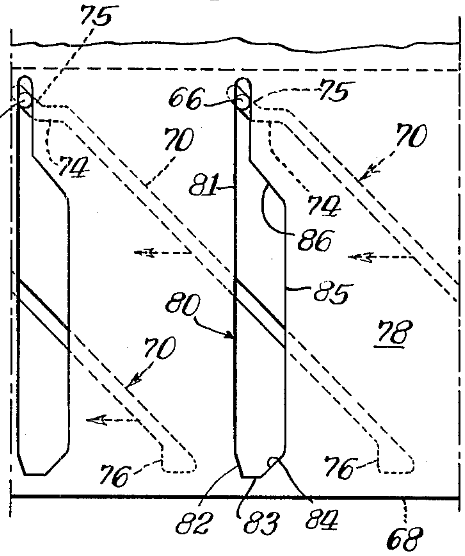
Figure 10:
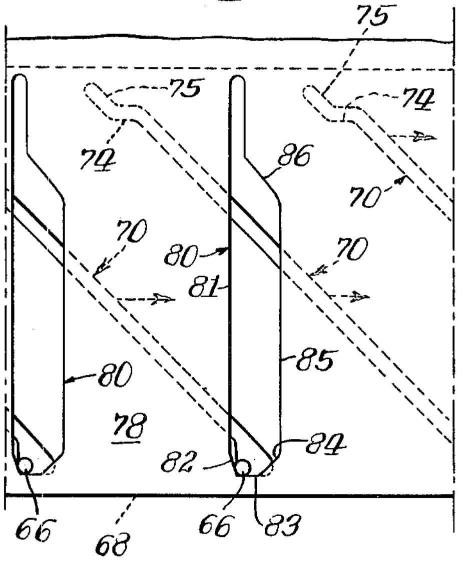
Figures 7, 8:
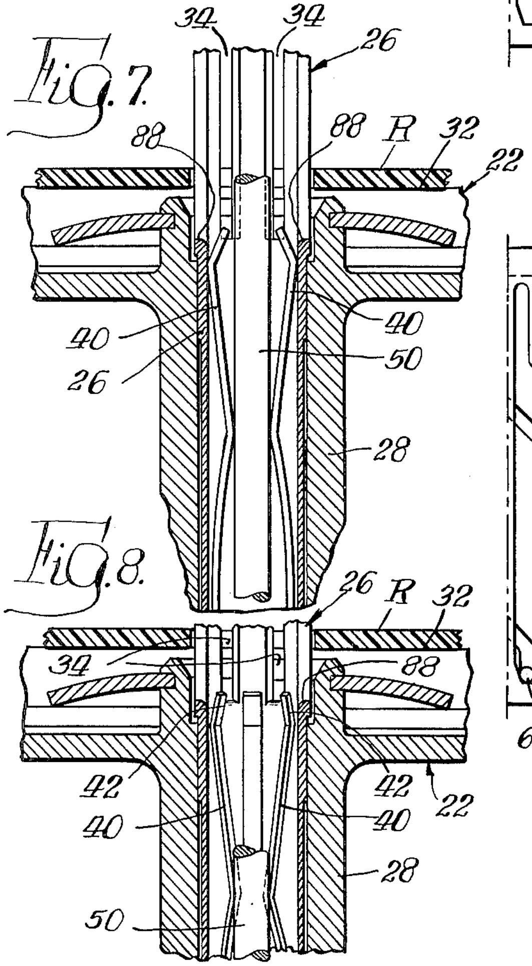

FIGURE 3*a* is an enlarged transverse section taken substantially along the line 3—3 of FIGURE 1 showing the lower portions of the primary supporting fingers in their normal rotary position wherein they are in alignment with corresponding vertical slots formed in the spindle body;

FIGURE 3*b* is a view similar to FIGURE 3*a* showing the supporting fingers in a second rotary position wherein they are out of alignment with the slots in the spindle body;

FIGURE 4 is an enlarged transverse sectional view taken substantially along the line 4—4 of FIGURE 1 showing a cross pin member which moves vertically and rotates with the primary supporting fingers, and further showing a pair of inner and outer generally tubular cam members which act upon the cross pin to control the vertical and rotational movement of the primary supporting fingers;

FIGURE 5 is a view similar to FIGURE 4 showing the relative positions of the pin and cam members when the primary supporting fingers are approximately in their lowermost position and have been rotated out of alignment with the slots in the spindle body preparatory to returning the fingers to their upper vertical position;

FIGURE 6 is an enlarged fragmentary vertical section showing the primary record supporting fingers as they approach their lowermost position and are about to be cammed radially inwardly to a retracted position within the spindle body;

FIGURE 7 is a view similar to FIGURE 6 showing the supporting fingers after they have positioned a record on the turntable and have been cammed radially inwardly to a retracted position within the spindle body;

FIGURE 8 is a view similar to FIGURE 7 showing the supporting fingers rotated to a position wherein they are out of alignment with the corresponding vertical slots formed in the spindle body;

FIGURE 9 is a developed view of inner and outer cam members each having a pair of oppositely disposed cam tracks which act upon the ends of a cross pin associated with the primary supporting fingers to control the vertical and rotational movement of the latter, the cam tracks in the stationary outer cam member being shown in solid lines and the cam tracks in the inner rotatable cam member being shown in dash lines;

FIGURE 10 is a view similar to FIGURE 9 showing the cross pin member disposed at the lower ends of the corresponding cam tracks; and FIGURES 11–16 are a series of elevational views showing the sequence of operations of the spindle of the present invention in order to lower a record to the turntable in a controlled manner and then return the primary supporting fingers to their original record supporting position.

Referring now to the drawings, FIGURE 1 shows a baseplate 20, a rotatable turntable 22, and a vertical self-supporting type spindle 24 which extends upwardly through the center of the turntable. The spindle 24 includes a tubular spindle body 26, and the turntable 22 is provided with a tubular sleeve 28 which is mounted over the spindle body and supported at its lower end on a thrust bearing 30. A record supporting surface is indicated at 32 and may comprise the upper surface of the usual rubber mat which is secured to the top of the turntable.

The spindle body 26 has a plurality of circumferentially spaced vertical slots 34 formed therein to accommodate both primary and secondary record supporting means which control the lowering of a stack of records one at a time to the turntable. In the embodiment shown there are six vertical slots 34 formed in the spindle body 26, and such slots extend upwardly almost to the upper end of the spindle body and downwardly slightly below the plane of the record supporting surface 32. A record supporting sleeve 36 is disposed within the spindle body 26 for vertical movement therein, and six primary record supporting fingers 40 are formed integral with the upper end of the sleeve 36 so as to extend upwardly therefrom. The inclined upper portions of the record supporting fingers 40 extend upwardly and radially outwardly so that they project through corresponding ones of the vertical slots 34 and extend radially outwardly of the spindle body 26. The extreme upper ends 42 of the primary supporting fingers 40 are bent so as to extend substantially vertically, and it will be understood that a plurality of records may be slipped downwardly over the upper end of the spindle body 26 and supported on the upper ends 42 of the supporting fingers.

An end cap 44 is pressed into the upper end of the spindle body 26, and a plurality of secondary record gripping fingers 46 are secured to the end cap so as to project substantially downwardly therefrom. Each of the secondary gripping fingers 46 has a resilient pad 48 secured to the radially outer face thereof, and the lower ends of the pads 48 are spaced vertically in known manner from the upper ends 42 of the primary supporting fingers 40 by an amount approximately equal to the thickness of a record. A control rod 50 is axially slidable within the spindle body 26 and has a frusto-conical cam surface 52 formed thereon for extending the secondary gripping fingers 46 radially outwardly when the rod is moved upwardly.

An extension on the lower end of the control rod 50 comprises a tubular member 54 which carries a cross pin 56 at its lower end. The upper end of the tubular extension 54 is secured to a flange 58 at the lower end of the control rod, and a compression spring 60 is disposed within the extension between the flange 58 and the cross pin 56. It will thus be understood that vertical movement of the cross pin 56 will produce vertical movement of the control rod 50, whereby when the rod is moved upwardly the gripping pads 48 will be expanded radially outwardly through the corresponding slots 34 to grip all but the lowermost record in a stack of records supported on the spindle, and when the rod 50 is moved downwardly the gripping pads 48 will be retracted. The compression spring 60 comprises a yielding connection between the pin 56 and the control rod 50 to limit the outward forces applied to the fingers 46 during a record gripping operation.

A rotary cam 62 is rotatably carried on the spindle body 26 and has internal cam surfaces 63 which act upon the ends of the cross pin 56 to control vertical movement thereof. The cam 62 also has external pinion teeth 64 formed on its upper end for cooperation with a reciprocating rack member (not shown) adapted to rotate the came for raising and lowering the control rod 50. The rotary cam 62 and rack means for actuating the same are fully described in my copending application Serial No. 268,042, filed March 26, 1963. For purposes of the present application it is sufficient to note that rotation of the cam 62 in one direction will cause the gripping pads 48 to be expanded radially to grip all but the lowermost record in a stack of records supported on the spindle by the primary supporting fingers 40, and rotation of the cam in the opposite direction will permit the pads 48 to retract to an inoperative position.

The lower end of the record supporting sleeve 36 carries a cross pin 66 which is acted upon by cam means to impart vertical and rotational movement to the sleeve 36 and the fingers 40 which are integral therewith, A generally tubular rotary cam 68 (see FIGURES 4 and 5) is rotatably mounted on the spindle body 26 beneath the rotary cam 62, and the cam 68 has a pair of oppositely disposed spiral cam slots 70 formed therein. FIGURES 9 and 10 are developed views showing the inclination of the slots 70. The opposite ends of the cross pin 66 project through the corresponding slots 70 whereby when the cam 68 is rotated in one direction the supporting sleeve 36 will be raised, and when the cam is rotated in the opposite direction the sleeve 36 will be lowered. The cam 68 has a plurality of pinion teeth 72 formed at its upper end (see FIGURE 1) to permit the cam to be rotated by corresponding reciprocating rack means (not shown). A cam similar to the cam 68 and rack means for rotating the same are fully described in my above-mentioned copending application Serial No. 268,042, but it should be understood that the cam 68 described herein is unique with respect to the length of the cam slots 70 formed therein since it is adapted to impart a vertical stroke to the supporting sleeve 36 sufficient to lower a record all of the way to the turntable supporting surface 32. As shown in FIGURES 9 and 10, each of the cam slots 70 is offset somewhat at its upper end to provide a short horizontal cam track portion 74 and an upper inclined portion 75, and the slots 70 are also widened somewhat at their extreme lower ends where there is provided a short vertical surface 76, the purposes of the foregoing being explained more fully hereinafter.

A second cam 78 is associated with the cross pin 66 to control its rotary motion, and the cam 78 is a generally tubular member which encompasses the rotary cam 68 and is concentric relative thereto (see FIGURES 4 and 5). The outer cam 78 is stationary and is fixedly supported on the spindle body 26, and the cam 78 has a pair of oppositely disposed cam tracks 80 formed therein through which project the ends of the cross pin 66. As shown in FIGURES 9 and 10, each cam track 80 includes a vertical portion 81, a short inclined portion 82 at the extreme lower end of the portion 81, a short horizontal portion 83 at the bottom of the cam track, an inclined portion 84 extending upwardly and to the right from the portion 83, a second vertical portion 85 which extends upwardly parallel to the first vertical portion 81, and an inclined portion 86 which extends from the upper end of the vertical portion 85 into communication with the first vertical portion 81.

It will now be understood that the vertical position of the supporting sleeve 36 is controlled by rotation of the inner rotary cam 68 and the rotation position of the sleeve is controlled by the outer stationary cam 78. When the inner cam 68 is rotated in a counterclockwise direction as viewed from above in FIGURES 4 and 5, the inner cam tracks 70 act on the cross pin 66 to raise the sleeve 36 to its uppermost position, and when the cam 68 is rotated in a clockwise direction the sleeve will be moved to its lowermost position. As shown in FIGURE 9, when the cross pin 66 carried by the sleeve 36 is in its uppermost position it will be disposed at the upper end of the vertical cam track portion 81 in the outer cam 78. When the cam 68 is rotated to lower the cross pin 66, the cam will in effect move to the left with reference to the developed view of FIGURE 9, whereby the pin 66 will be urged against the left side of the track 81 and will move down that track without any tendency to follow the alternate path provided by the track portion 86. When the pin 66 reaches the bottom of the track portion 81 the end of the pin as shown in FIGURE 10 will be moved slightly to the right by the inclined track portion 82, thus imparting a slight rotation to the supporting sleeve 36 (counterclockwise as viewed in FIGURE 5). When the rotary cam 68 is subsequently rotated in the opposite direction, whereby the cam track 70 will in effect be moved to the right as viewed in FIGURE 10, the short vertical cam surface 76 at the lower end of the track 70 will rotate the cross pin 66 causing it to engage the inclined portion 84 of the cam track 80 in the outer cam 78, whereby the pin will be elevated above the vertical portion 76 of the cam track 70 and further rotation of the inner cam 68 will cause the pin to ride up the track portion 85 of the cam track 80. When the upwardly moving pin 66 reaches the inclined portion 86 of the outer cam track 80 the pin will be caused to return to the vertical portion 81 of the outer cam track 80, and it will continue its upward movement until it reaches the upper end of the track 81 in the outer cam, whereupon the rotation of the inner cam 68 is stopped.

It will be understood from the foregoing that when the pin 66 is riding down the track portion 81 of the outer cam track 80 the record supporting sleeve 36 is in a first rotational position, and when the pin 66 is riding up the track portion 85 the sleeve is in a second rotational position. In the embodiment being described, the vertical slots 34 formed in the tubular spindle body 26 are spaced 60 degrees apart, and it will thus be understood that if in the first rotational position of the supporting sleeve 36 the primary supporting fingers 40 are aligned with the slots 34, then by rotating the sleeve 30 degrees the supporting fingers 40 will be disposed out of alignment with the slots, and will in fact be disposed midway between a pair of adjacent slots 34. Accordingly, the spacing between the parallel vertical cam track portions 81 and 85 formed in the stationary outer cam 78 is determined so as to correspond with a 30 degrees rotation of the pin 66 and sleeve 36.

Thus, when the sleeve 36 is in its uppermost position the supporting fingers 40 thereon will be aligned with the slots 34 in the spindle body, and as the sleeve is moved downwardly the fingers will remain in alignment with the slots. However, at the beginning of the upward stroke of the sleeve 36 it will be rotated 30 degrees to move the fingers 40 out of alignment with the slots 34 as shown in FIGURES 3*b* and 8, and the fingers will again be aligned with the slots only when the pin 66 is raised to the point where it engages the inclined cam track portion 86 in the outer cam track 80. It will be noted that there is never any tendency for the pin 66 to enter the wrong portion of the cam track 80 since, with reference to FIGURES 9 and 10, the cam track 70 will urge the pin to the left during the downstroke and to the right during the upstroke.

FIGURE 1 shows the manner in which the supporting fingers 40 project outwardly through the slots 34 in the spindle body 26 when the sleeve 36 is in its uppermost position and the fingers are in alignment with the slots. When the inner rotary cam 68 is rotated in order to lower the sleeve 36, the fingers 40 will not be retracted until they engage the lower edges 88 of the slots 34 (as best shown in FIGURE 6). Since the lower edges 88 of the slots 34 are disposed beneath the turntable record supporting surface 32, a record R will almost have been lowered to the supporting surface 32 before the supporting fingers 40 begin to retract. As the sleeve 36 moves further downwardly, the fingers 40 will be drawn below the slots 34 and will be fully retracted within the spindle body 26 as shown in FIGURE 7, and a record R will be lowered to the turntable supporting surface 32 in a controlled manner without being dropped thereto.

Once the supporting fingers 40 have been fully retracted and the record R has been lowered to the turntable, the cross pin 66 will be approximately in the position shown in FIGURE 10 relative to the inner and outer cam tracks 70 and 80. Thus, when the inner cam 68 having the track 70 is rotated in the opposite direction (moved to the right as viewed in FIGURE 10), the sleeve 36 will be rotated approximately 30 degrees and the supporting fingers 40 will be moved out of alignment with the slots 34 as shown in FIGURES 3*b* and 8. Thereafter, further movement of the cam 68 will cause the pin 66 to be moved up the vertical track 85 in the outer cam track 80 and the supporting fingers will be moved upwardly while still held in a radially retracted position since they will ride along the inner wall of the spindle body 26. When the sleeve 36 has been raised to the level where the cross pin 66 engages the inclined portion 86 in the outer cam track 80, the sleeve 36 will be rotated 30 degrees back to its original rotational position whereby the fingers 40 will again be aligned with the slots 34 and will thus project radially outwardly through the slots in operative record supporting positions. Further rotation of the inner cam 68 will raise the pin 66 to the position shown in FIGURE 9 at which time the supporting fingers 40 will be disposed in their normal positions as shown in FIGURE 1.

It will be readily understood by those skilled in the art that the cam 62 must be rotated to raise the control rod 50 and expand the secondary gripping fingers 46 and pads 48 radially outwardly in order to grip all but the lowermost record in a stack, and that such operation must be carried out prior to the lowering of the sleeve 36 and supporting fingers 40. The control rod 50 must be maintained in its upper operative position to maintain the gripping fingers 46 expanded until a record R has been lowered to the turntable and the supporting fingers 40 have been returned to their operative record supporting positions as shown in FIGURE 1. Thereafter, the cam 62 is rotated to lower the control rod 50 and permit the secondary supporting fingers 46 to retract, whereby the stack of records R will again be supported on the upper ends 42 of the fingers 40. It will of course be noted that the reciprocating rack members (not shown) which control the rotation of the two rotary cams 62 and 68 must be operated in predetermined timed sequence relative to one another, and actuating mechanism for accomplishing the proper sequence of operations is described in the above-mentioned copending application Serial No. 268,042.

Figure 12:
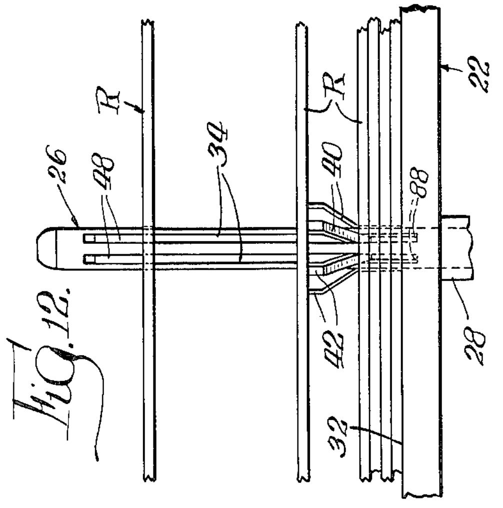
Figure 11:
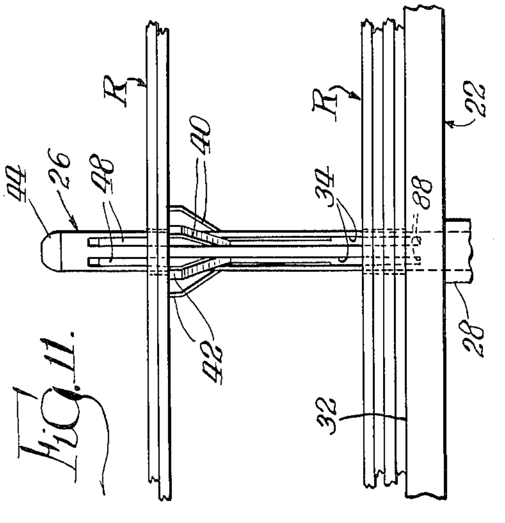

FIGURES 11–16 illustrate the sequence of operations of the spindle structure of the present invention. As shown in FIGURE 11, a plurality of records R are supported on the turntable supporting surface 32, while two records R are supported on the upper end of the spindle on the primary supporting fingers 40 which are in their normal operative positions. FIGURE 12 shows the secondary gripping fingers 46 and pads 48 expanded to support the next-to-lowermost record (and any other records which might be disposed thereabove) while the sleeve 36 and supporting fingers 40 have been lowered and the fingers are about to be retracted. It will be noted that with a plurality of records R already disposed on the turntable, the supporting fingers 40 will engage the latter records at their centerholes and will be retracted by the records themselves rather than by the lower edges 88 of the vertical slots 34, although the downward travel of the supporting fingers will always carry them slightly below the lower ends of the slots 34. Thus, without any records on the turntable, the fingers 40 are not retracted until they engage the lower edges 88 of the slots 34, but where several records are already on the turntable, the supporting fingers 40 will be retracted due to engagement with such records.

It will be understood from the foregoing that the record being lowered will be released as it reaches the top of the stack of records on the turntable, regardless of how many records there may be on the turntable. Due to the fact that the supporting fingers 40 do engage the records already on the turntable, it is preferable that the spindle mechanism of the present invention be used in conjunction with mechanism for stopping the turntable during a record change cycle. However, mechanism for stopping the turntable during a record change cycle is well known to those skilled in the art, and since such mechanism is not itself a part of the present invention it will not be described herein.

Figure 13:
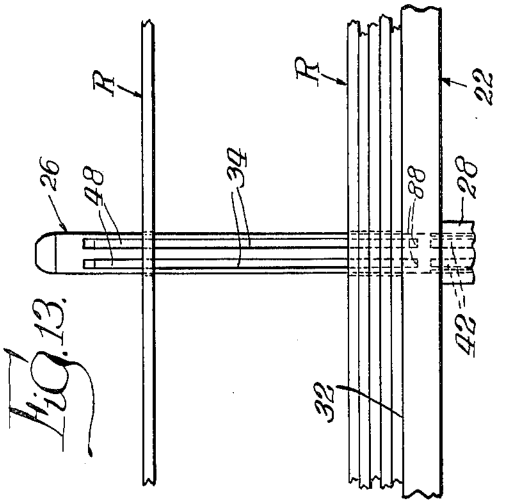
Figure 16:
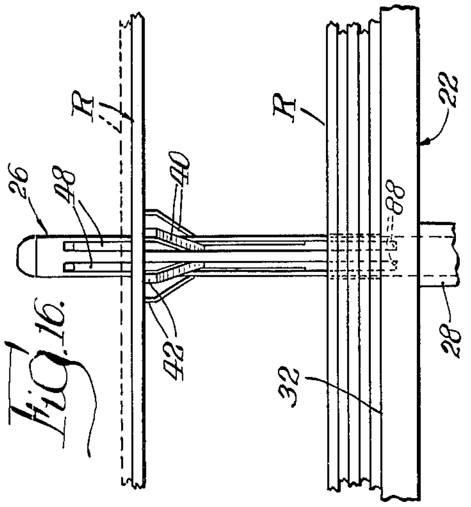
Figure 15:
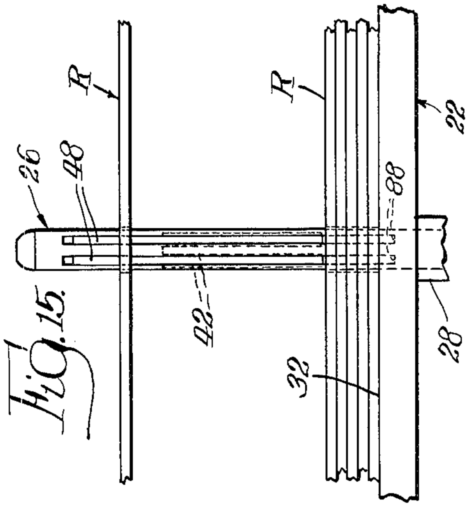
Figure 14:
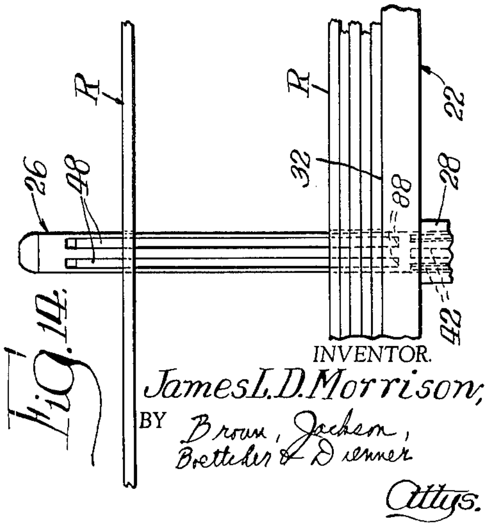

FIGURE 13 shows the fingers 40 fully retracted within the spindle body 26, and the record which was lowered thereby is supported on the top of the stack of records on the turntable. FIGURE 14 shows the supporting fingers 40 still in their lowermost position but rotated 30 degrees so as to be out of alignment with the slots 34 in the spindle body. FIGURE 15 shows the sleeve 36 and primary supporting fingers 40 being raised toward their upper position, and the fingers are still retracted as they are riding along the inner wall of the spindle body 26. As the sleeve 36 and supporting fingers 40 approach their uppermost position, the sleeve is rotated 30 degrees in the opposite direction and thus returned to its original rotational position, whereby the fingers 40 are aligned with the slots 34 and spring outwardly therethrough. FIGURE 16 shows the fingers 40 after they have returned to their original position at which time the secondary gripping fingers 46 and pads 48 are retracted.

Referring to FIGURE 9, the horizontal cam portion 74 near the upper end of the cam track 70 represents the normal position of the cross pin 66 and corresponds with the position of the supporting fingers 40 as shown in FIGURE 1. If the supporting fingers 40 are raised only to the position of FIGURE 1 after lowering a record to the turntable, then the remainder of the stack of records being supported by the gripping pads 48 will be dropped a distance approximately equal to the thickness of one record when the pads 48 are retracted. However, FIGURE 9 shows an inclined portion 75 at the extreme upper end of the cam track 70 which will permit the inner rotary cam 68 to be rotated sufficiently to raise the supporting fingers upwardly substantially into engagement with the underside of the lowermost record being supported by the gripping pads 48, whereby the pads 48 may be retracted and the stack permitted to rest upon the fingers 40 without being dropped the thickness of a record. Once the pads 48 are retracted, the cam 68 must then be rotated slightly in the opposite direction to return the cross pin 66 to its normal position wherein it is supported on the horizontal cam track portion 74 of the cam track 70. In the latter position, any desired number of records may be supported on the fingers 40 without tending to rotate the cam member 68.

While the reciprocating rack members for actuating the rotary cams 62 and 68 are not described herein, it should be understood that the tubular outer stationary cam 78 is provided with openings in the wall thereof sufficient to permit such rack members to mesh with the pinion teeth 64 and 72 respectively.

In addition, those skilled in the art will also understand that if the spindle of the present invention is used in conjunction with means for stopping the turntable during a record change cycle, then the above-mentioned rack members will have to be driven from the record changer motor rather than from the turntable.

While I have illustrated my invention in a preferred form, I do not intend to be limited to such form except insofar as the appended claims are so limited, since modifications coming within the scope of my invention will be readily suggested to others with my disclosure before them.

I claim:

1. In a record changer having a turntable with a record supporting surface thereon and a spindle of the self-supporting type extending upwardly through the center of the turntable, the improvement comprising, in combination, a hollow spindle body having a plurality of circumferentially spaced vertical slots therein, a plurality of record supporting fingers which normally extend through corresponding ones of said slots and outwardly of said spindle body to support a stack of records thereon, secondary supporting means for supporting all but the bottom record in a stack of records resting on said fingers, means for lowering said supporting fingers and retracting the same within said spindle body to transfer said bottom record to said turntable record supporting surface, and means for moving said fingers out of alignment with said slots while in their retracted position and thereafter raising said fingers whereby said fingers will ride along the inner wall of said spindle body during at least a portion of the upward movement thereof.

2. In a record changer having a turntable with a record supporting surface thereon and a spindle of the self-supporting type extending upwardly through the center of the turntable, the improvement comprising, in combination, a hollow spindle body having a plurality of circumferentially spaced vertical slots therein, a plurality of record supporting fingers which normally extend through corresponding ones of said slots and outwardly of said spindle body to support a stack of records thereon, secondary supporting means for supporting all but the bottom record in a stack of records resting on said fingers, means for lowering said supporting fingers and retracting the same within said spindle body to transfer said bottom record to said turntable record supporting surface and for subsequently raising said supporting fingers to their original upper vertical position, and means for moving said supporting fingers out of alignment with said vertical slots while they are retracted and approximately in their lowermost position and for subsequently moving said fingers into alignment with said slots after they have been moved upwardly at least a substantial portion of the distance to their upper vertical position.

3. In a record changer having a turntable with a record supporting surface thereon and a spindle of the self-supporting type extending upwardly through the center of the turntable, the improvement comprising, in combination, a hollow spindle body having a plurality of circumferentially spaced vertical slots therein which extend downwardly at least approximately to the plane of the turntable record supporting surface, a plurality of record supporting fingers the upper ends of which normally extend through corresponding ones of said slots and outwardly of said spindle body to support a stack of records positioned over the upper end of said spindle body, secondary supporting means for supporting all but the bottom record in a stack of records resting on said fingers, means for lowering said supporting fingers beneath the lower ends of said slots whereby said bottom record will be lowered in a controlled manner substantially the entire distance to said turntable record supporting surface and said fingers will be cammed inwardly to radially retracted positions to release the record approximately as it reaches said supporting surface, said last-mentioned means being adapted to subsequently raise said supporting fingers to their original upper vertical position, and means for moving said supporting fingers out of alignment with said vertical slots while they are retracted and approximately in their lowermost position and for subsequently moving said fingers into alignment with said slots after they have been moved upwardly at least a substantial portion of the distance to their upper vertical position.

4. In a record changer having a turntable with a record supporting surface thereon and a spindle of the self-supporting type extending upwardly through the center of the turntable, the improvement comprising, in combination, a hollow spindle body having a plurality of circumferentially spaced vertical slots therein which extend downwardly at least approximately to the plane of the turntable record supporting surface, a plurality of record supporting fingers the upper ends of which normally extend through corresponding ones of said slots and outwardly of said spindle body to support a stack of records positioned over the upper end of said spindle body, secondary supporting means for supporting all but the bottom record in a stack of records resting on said fingers, means for lowering said supporting fingers beneath the lower ends of said slots whereby said bottom record will be lowered in a controlled manner substantially the entire distance to said turntable record supporting surface and said fingers will be cammed inwardly to radially retracted positions to release the record approximately as it reaches said supporting surface, said last-mentioned means being adapted to subsequently raise said supporting fingers to their original upper vertical position, and means for rotating said fingers as a unit about the axis of said spindle while they are retracted and approximately in their lowermost position so as to move said fingers out of alignment with said vertical slots and for subsequently rotating said fingers as a unit back into alignment with said vertical slots after they have been moved upwardly at least a substantial portion of the distance to their upper vertical position.

5. In a record changer having a turntable with a record supporting surface thereon and a spindle of the self-supporting type extending upwardly through the center of the turntable, the improvement comprising, in combination, a hollow spindle body having a plurality of circumferentially spaced vertical slots therein which extend downwardly at least approximately to the plane of the turntable record supporting surface, a record supporting member movable vertically and rotatable within said spindle body, a plurality of record supporting fingers the upper ends of which normally extend through corresponding ones of said slots and outwardly of said spindle body to support a stack of records positioned over the upper end of said spindle body, said fingers being carried as a unit on said record supporting member for vertical and rotational movement therewith, secondary supporting means for supporting all but the bottom record in a stack of records resting on said fingers, means for lowering said record supporting member so as to lower said supporting fingers beneath the lower ends of said slots whereby said bottom record will be lowered in a controlled manner substantially the entire distance to said turntable record supporting surface and said fingers will be cammed inwardly to radially retracted positions to release the record approximately as it reaches said supporting surface, said last-mentioned means being adapted to subsequently raise said record supporting member to raise said supporting fingers to their original upper vertical position, and means for rotating said record supporting member to rotate said fingers as a unit about the axis of said spindle while they are retracted and approximately in their lowermost position so as to move said fingers out of alignment with said vertical slots and for subsequently rotating said record supporting member to rotate said fingers as a unit back into alignment with said vertical slots after they have moved upwardly at least a substantial portion of the distance to their upper vertical position.

6. The invention of claim 5 wherein said record supporting member carries a cross pin adapted to be acted upon to impart rotational movement to said record supporting member and said record supporting fingers carried thereby, and wherein said means for rotating said record supporting member comprises a cam having a cam track in which said cross pin is received.

7. The invention of claim 6 wherein said cam is stationary and said cam track includes two vertical parallel track portions, a first vertical track portion for guiding said cross pin during downward movement of said record supporting member when said fingers are in alignment with said slots and a second vertical track portion for guiding said cross pin during upward movement of said record supporting member when said fingers are out of alignment with said slots, and an inclined track portion extending from the upper end of said second vertical track to said first vertical track for acting upon said pin to return said fingers to a position of alignment with said slots.

8. In a record changer having a turntable with a record supporting surface thereon and a spindle of the self-supporting type extending upwardly through the center of the turntable, the improvement comprising, in combination, a hollow spindle body having a plurality of circumferentially spaced vertical slots therein which extend downwardly at least approximately to the plane of the turntable record supporting surface, a record supporting sleeve movable vertically and rotatable within said spindle body, a plurality of record supporting fingers the upper ends of which normally extend through corresponding ones of said slots and outwardly of said spindle body to support a stack of records positioned over the upper end of said spindle body, said fingers being integral with the upper end of said sleeve and being formed to project upwardly and outwardly therefrom, secondary supporting means for supporting all but the bottom record in a stack of records resting on said fingers, means for lowering said record supporting sleeve so as to lower said fingers beneath the lower ends of said slots whereby said bottom record will be lowered in a controlled manner substantially the entire distance to said turntable record supporting surface and said fingers will be cammed inwardly to radially retracted positions to release the record approximately as it reaches said supporting surface, said last-mentioned means being adapted to subsequently raise said record supporting sleeve to raise said fingers to their upper original vertical position, a cross pin carried by said sleeve, and a cam having a cam track in which said cross pin is received for rotating said sleeve and thereby rotating said fingers as a unit about the axis of said spindle while they are retracted and approximately in their lowermost position so as to move said fingers out of alignment with said vertical slots and for subsequently rotating said sleeve to rotate said fingers as a unit back into alignment with said vertical slots after they have moved upwardly at least a substantial portion of the distance to their upper vertical position.

9. In a record changer having a turntable with a record supporting surface thereon and a spindle of the self-supporting type extending upwardly through the center of the turntable, the improvement comprising, in combination, a hollow spindle body having a plurality of circumferentially spaced vertical slots therein, a record supporting member adapted to move vertically and rotate within said spindle body, a plurality of record supporting fingers which normally extend through corresponding ones of said slots and outwardly of said spindle body to support a stack of records thereon, said fingers being carried as a unit on said record supporting member for vertical and rotational movement therewith, secondary supporting means for supporting all but the bottom record in a stack of records resting on said fingers, a cross pin carried by said record supporting member, a first rotary cam having an inclined cam track in which said cross pin is disposed, said cam being rotatable in a first direction for lowering said record supporting member and said fingers and thereby retracting the latter within said spindle body to transfer said bottom record to said turntable record supporting surface and being rotatable in the opposite direction for subsequently raising said supporting fingers to their original upper vertical position, and a second stationary cam having a stationary cam track in which said cross pin is disposed for rotating said record supporting member and thereby moving said supporting fingers out of alignment with said vertical slots while they are retracted and approximately in their lowermost position and for subsequently moving said fingers into alignment with said slots after they have been moved upwardly at least a substantial portion of the distance to their upper vertical position, said stationary cam track having a pair of spaced parallel vertical track portions, one track portion for guiding said cross pin during its downward travel and the other track portion for guiding said cross pin during its upward vertical travel, and said stationary cam track also comprising an inclined track portion extending from the upper end of said other track portion into communication with said one track portion for returning said fingers into alignment with said slots.

10. The invention of claim 9 wherein said first rotary cam is a generally tubular member mounted externally of the spindle body in concentric relation thereto and having a cam track formed in the wall thereof, and said second stationary cam comprises a generally tubular member mounted in concentric relation with respect to said spindle body and having said stationary cam track formed in the wall thereof, said rotary cam being adapted to exert a rotational force on said cross pin to urge the same toward said one track portion of said stationary cam during downward travel of said pin and toward said other track portion during upward travel of said pin whereby said pin will always tend to move in the proper one of said pair of vertical track portions.

11. In a record changer having a turntable with a record supporting surface thereon and a spindle of the self-supporting type extending upwardly through the center of the turntable, said spindle having secondary record supporting means normally contained within the spindle at an upper storage portion thereof and movable radially outwardly to support all but the lowermost record in a stack of records disposed on the storage portion of the spindle when the lowermost record is to be released to the turntable for playing, the improvement comprising, in combination, a hollow spindle body, a plurality of circumferentially spaced vertical slots formed in said spindle body so as to extend from the upper storage portion thereof downwardly at least approximately to the plane of said turntable record supporting surface, a plurality of vertically movable radially retractable fingers normally disposed approximately at the upper end of their vertical stroke wherein the upper ends of said fingers extend outwardly of said spindle body through corresponding ones of said slots to support a stack of records on said upper storage portion of said spindle, and actuating means having a stroke sufficient to effect movement of said record supporting fingers downwardly the entire distance to said turntable, said actuating means being operative when said secondary supporting frame means is disposed radially outwardly to support all but the lowermost record in a stack, whereby said lowermost record will be lowered in a controlled manner substantially the entire distance to said turntable and said fingers will be cammed inwardly to radially retracted positions to release said record approximately as it reaches said turntable, said actuating means being operable to return said fingers to their normal upper extended position to support the remainder of said stack during the playing of said lowermost record.

References Cited by the Examiner

UNITED STATES PATENTS 3,129,006 4/1964 Zahner et al. -------- 274—105

FOREIGN PATENTS 1,038,785 9/1958 Germany.
1,093,106 11/1960 Germany.

NORTON ANSHER, *Primary Examiner.*